(12) United States Patent
Hori (10) Patent No.: US 9,323,472 B2
(45) Date of Patent: Apr. 26, 2016

(54) STORAGE CONTROLLING DEVICE AND CONTROLLING METHOD

(71) Applicant: FUJITSU LIMITED, Kawasaki-shi, Kanagawa (JP)

(72) Inventor: Takashi Hori, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 148 days.

(21) Appl. No.: 14/305,088

(22) Filed: Jun. 16, 2014

(65) Prior Publication Data

US 2015/0019826 A1     Jan. 15, 2015

(30) Foreign Application Priority Data

Jul. 9, 2013    (JP) ................................. 2013-143487

(51) Int. Cl.
    *G06F 12/00*      (2006.01)
    *G06F 3/06*       (2006.01)
    *G06F 13/16*      (2006.01)

(52) U.S. Cl.
    CPC .............. *G06F 3/0658* (2013.01); *G06F 3/061* (2013.01); *G06F 3/0689* (2013.01); *G06F 13/16* (2013.01); *G06F 2003/0697* (2013.01)

(58) Field of Classification Search
None
See application file for complete search history.

(56) References Cited

U.S. PATENT DOCUMENTS

2011/0167189 A1    7/2011   Matsubara et al.
2012/0054381 A1    3/2012   Craddock et al.

FOREIGN PATENT DOCUMENTS

JP    2012-048712     3/2012
JP    2012-133405     7/2012

*Primary Examiner* — Brian Peugh
(74) *Attorney, Agent, or Firm* — Fujitsu Patent Center (57) ABSTRACT

A Controller Module (CM) includes a memory that temporarily stores therein data to be written into storage, a switch that connects to another CM and a DMA controller that transfers the data stored in the memory to the other CM via the switch. The DMA controller reads a transfer status of the transferred data from the switch and writes the read transfer status into the memory.

7 Claims, 8 Drawing Sheets

STORAGE CONTROLLING DEVICE AND CONTROLLING METHOD

CROSS-REFERENCE TO RELATED APPLICATION

This application is based upon and claims the benefit of priority of the prior Japanese Patent Application No. 2013-143487, filed on Jul. 9, 2013, the entire contents of which are incorporated herein by reference.

FIELD

The embodiments discussed herein are related to a storage controlling device and the like.

BACKGROUND

In a storage device, a plurality of Controller Modules (CMs) are connected to each other via a Peripheral Component Interconnect (PCI) Express Bus. To duplicate data and to exchange control information, an inter-CM communication is performed between the plurality of CMs. The inter-CM communication may fail depending on the state of communication paths. In that situation, in order to properly perform a recovery process, the CM provided on the communication starting side needs to correctly understand whether the communication was normally performed or not for each command. The CM is able to understand whether the communication was normally performed or not, by checking to see if a DMA controller thereof had a normal termination or checking to see if a switch thereof has properly made a transfer to the outside.

Figure 8:
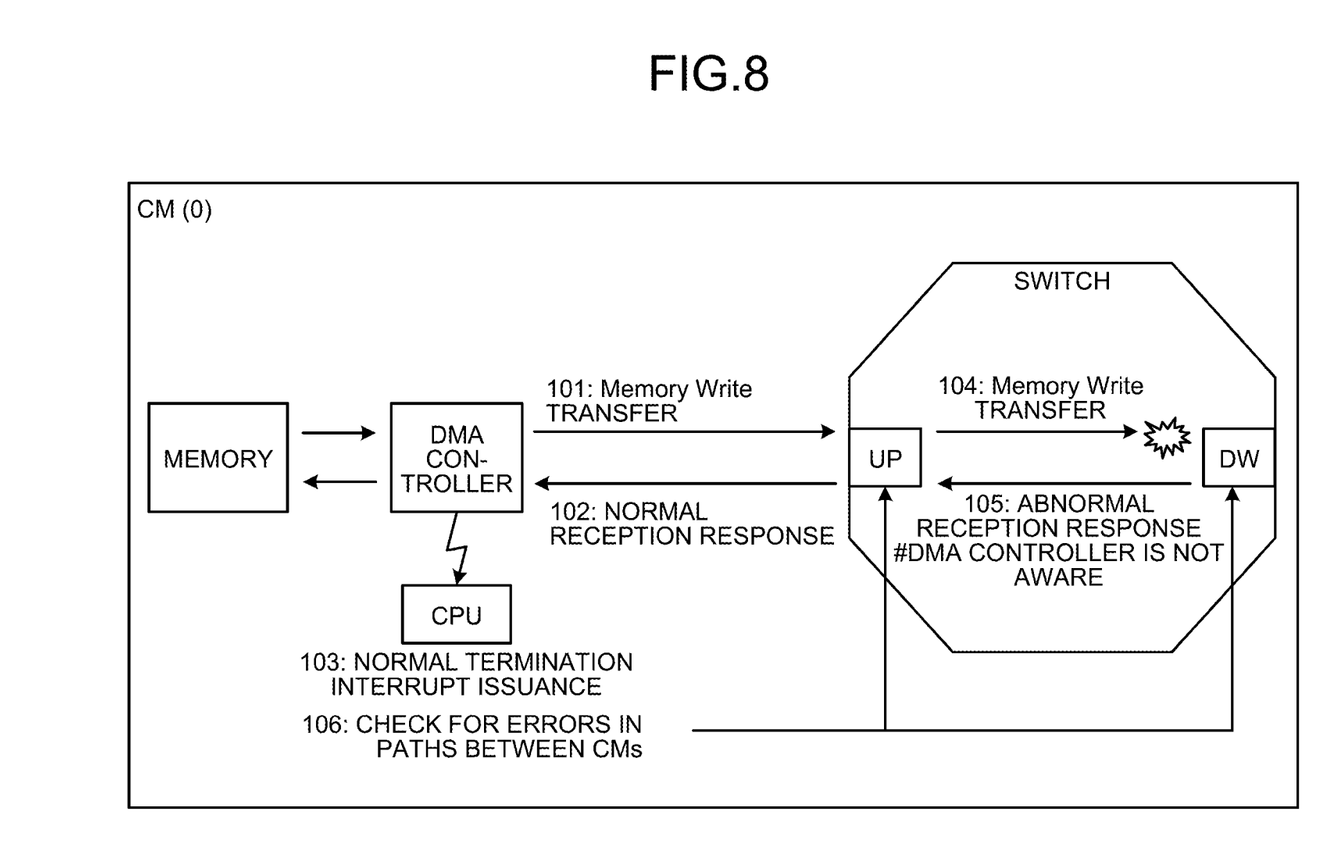
FIG. 8 is a drawing for explaining an abnormal detection in communication paths between CMs.

First, an abnormality detection in communication paths between CMs will be explained, with reference to FIG. 8. FIG. 8 is a drawing for explaining the abnormality detection in the communication paths between the CMs. In the example illustrated in FIG. 8, it is assumed that a CM 0 is the CM provided on the communication starting side. The CM 0 includes a memory, a Direct Memory Access (DMA) controller, a Central Processing Unit (CPU), and a switch. The switch may be a PCI Express switch, for example.

First, the DMA controller instructs the switch to perform, on the data stored in the memory, a write transfer to a memory of another CM (step S101). The switch receives the instruction to perform the write transfer to the memory and transmits a response indicating normal (hereinafter, a "normal response") in response to the write transfer to the memory (step S102). The normal response only guarantees the receipt of the request to the other CM and does not guarantee that the other CM has completed the writing process into the memory. The DMA controller receives the normal response and notifies the CPU of a normal termination interrupt (step S103).

The switch receives the instruction to perform the write transfer to the memory and performs the write transfer to the memory of the other CM (step S104). In this situation, let us assume that the switch fails the write transfer. In that situation, the switch transmits a response indicating that the write transfer was abnormal (step S105). The DMA controller, however, is not able to recognize that the write transfer was abnormal.

The CPU is notified of the normal termination interrupt and reads, from each of the devices on the paths in the switch, information indicating whether any abnormality has occurred in the paths between the CMs (step S106). Even if the reading process by the CPU is performed at a point in time when the write transfer to the memory in the other CM has not yet been completed, the CPU is able to read the information indicating whether an abnormality has occurred in the paths between the CMs, the information indicating the result of the completion of the write transfer to the memory. The reason is that the PCI Express switch is configured to perform the reading process after the writing process into the memory is performed.

Patent Document 1: Japanese Laid-open Patent Publication No. 2012-133405
Patent Document 2: Japanese Laid-open Patent Publication No. 2012-48712

However, a problem is observed where, when the write transfer to the memory of the other CM is performed, the entire performance within the CM is degraded. For example, because the CPU reads the information indicating whether an abnormality has occurred in the paths in the switch, the CPU is being used during the reading process and is not able to perform any other processes. As a result, the entire performance within the CM is degraded.

SUMMARY

According to an aspect of an embodiment, a storage controlling device includes a memory, a switch, a data transfer unit and a transfer status detecting unit. The memory temporarily stores therein data to be written into storage. The switch connects to another storage controlling device. The data transfer unit transfers the data stored in the memory to the another storage controlling device via the switch. The transfer status detecting unit reads a transfer status of the data transferred by the data transfer unit from the switch and writes the read transfer status into the memory.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. The present disclosure is not limited to the exemplary embodiments. In the following sections, examples in which the present disclosure is applied to a Redundant Arrays of Inexpensive Disks (RAID) apparatus will be explained.

[a] First Embodiment

A Configuration of a RAID Apparatus

Figure 1:
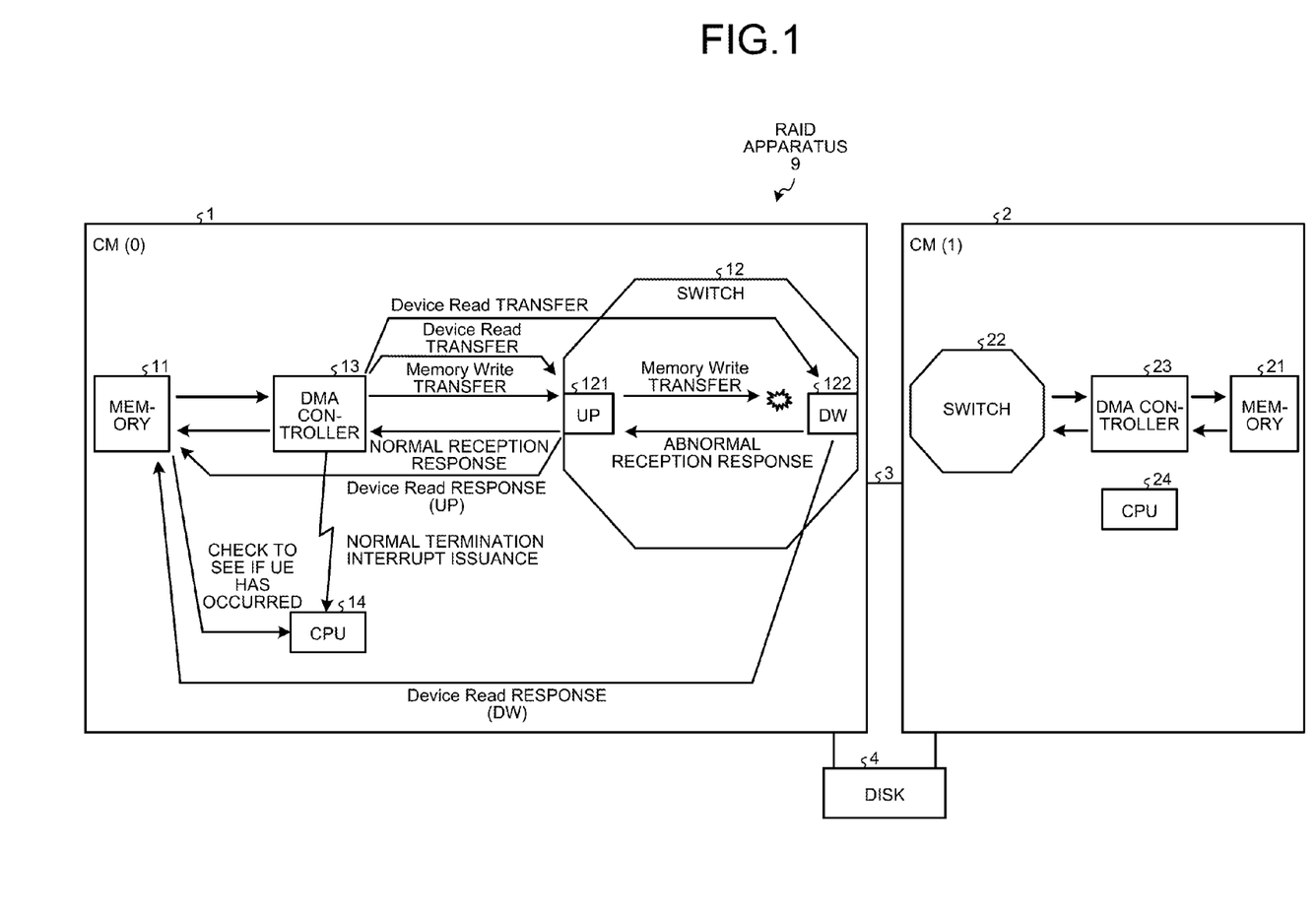
FIG. 1 is a diagram of a hardware configuration of a Redundant Arrays of Inexpensive Disks (RAID) apparatus according to a first embodiment.

FIG. 1 is a diagram of a hardware configuration of a RAID apparatus according to a first embodiment. As illustrated in FIG. 1, a RAID apparatus 9 includes a plurality of controller modules (CMs) 1 and 2, a PCI bus 3, and a disk 4. The CMs 1 and 2 are arranged to be redundant. In the present example, the CM 1 in system 0 and the CM 2 in system 1 perform an inter-CM communication via the PCI bus 3. The PCI bus 3 may be a PCI Express bus, for example.

The CMs 1 and 2 each can connect to storage such as the disk 4 and are configured to control the disk 4 storing data therein. The CM 1 is a CM provided on the communication starting side and serves as an example of the "storage controlling device". The CM 2 serves as an example of "another storage controlling device".

The CM 1 includes a memory 11, a switch 12, a DMA controller 13, and a CPU 14. The CM 2 includes a memory 21, a switch 22, a DMA controller 23, and a CPU 24. The devices included in the CM 2 are the same as those included in the CM 1. Thus, the explanation of the CM 2 will be omitted.

The memory 11 temporarily stores therein data to be written into the disk 4.

The switch 12 may be a PCI Express switch, for example, and is configured to perform a data transfer to the switch 22 in the other CM, i.e., the CM 2 (hereinafter, "the other CM 2") and to perform a data transfer between devices within the CM 1. The switch 12 includes a device (hereinafter, "UP") 121 provided on the DMA controller 13 side and a device (hereinafter, "DW") 122 provided on the other CM 2 side. The UP 121 stores therein, for example, information about the state of whether a write transfer instruction was normally received or not. The DW 122 stores therein, for example, information about the state of whether a write transfer to the other CM 2 has normally been completed or not.

For example, according to an instruction from the DMA controller 13 (explained later) to perform a write transfer to the memory 21 of the other CM 2, the switch 12 responds to the DMA controller 13 that the write transfer instruction was normally received. In addition, the switch 12 instructs, via the PCI bus 3, the other CM 2 to perform the write transfer to the memory 21. In this situation, if the write transfer has failed, the switch 12 responds to the UP 121 that the write transfer was abnormal. In one example, the abnormality can occur in the transfer between the UP 121 and the DW 122 or in the transfer from the DW 122. The abnormality in the write transfer in this situation will be referred to as an uncorrectable error (hereinafter, "UE"). In contrast, if the write transfer is successful, the switch 12 responds to the UP 121 that the write transfer was normal. However, that the switch 12 does not notify the DMA controller 13 of whether the write transfer was normal or abnormal.

Further, according to an instruction from the DMA controller 13 to read a data transfer status, the switch 12 reads the transfer status from the UP 121 and the DW 122 and responds to the DMA controller 13 with the read transfer status.

The DMA controller 13 is a controller that implements a method called a Direct Memory Access (DMA) by which data is directly transferred between the memory 11 and each of the devices without going through the CPU 14. The DMA controller 13 serves as an example of the data transfer unit and the transfer status detecting unit.

For example, the DMA controller 13 instructs the switch 12 to perform, on the data stored in the memory 11, the write transfer to the memory 21 of the other CM 2. Upon receiving a normal response from the switch 22 in response to the instruction to perform the write transfer to the memory 21, the DMA controller 13 notifies the CPU 14 of a normal termination interrupt. However, that the normal response only guarantees the receipt of the request to the other CM 2 and does not guarantee the completion of the write transfer to the other CM 2.

Further, the DMA controller 13 instructs the UP 121 of the switch 12 to read a data transfer status. Upon receiving the data transfer status from the UP 121 of the switch 12, the DMA controller 13 writes the received transfer status into the memory 11. Further, the DMA controller 13 instructs the DW 122 of the switch 12 to read a data transfer status. Upon receiving the data transfer status from the DW 122 of the switch 12, the DMA controller 13 writes the received transfer status into the memory 11. With these arrangements, because the DMA controller 13 is able to read the data transfer statuses directly from the switch 12 without going through the CPU 14, the processing by the CPU 14 is not performed. Thus, the entire performance within the CM 1 is improved.

The CPU 14 reads the transfer status written in the memory 11. For example, at the time when the CPU 14 receives a response corresponding to a transfer status written in the memory 11 by the DMA controller 13, the CPU 14 reads the transfer status. With this arrangement, because the CPU 14 reads the transfer status not from the switch 12 but from the memory 11, it is possible to speedily detect abnormalities in the paths between the CMs. The CPU 14 serves as an example of the controlling unit.

A Sequence of the CM

Figure 2:
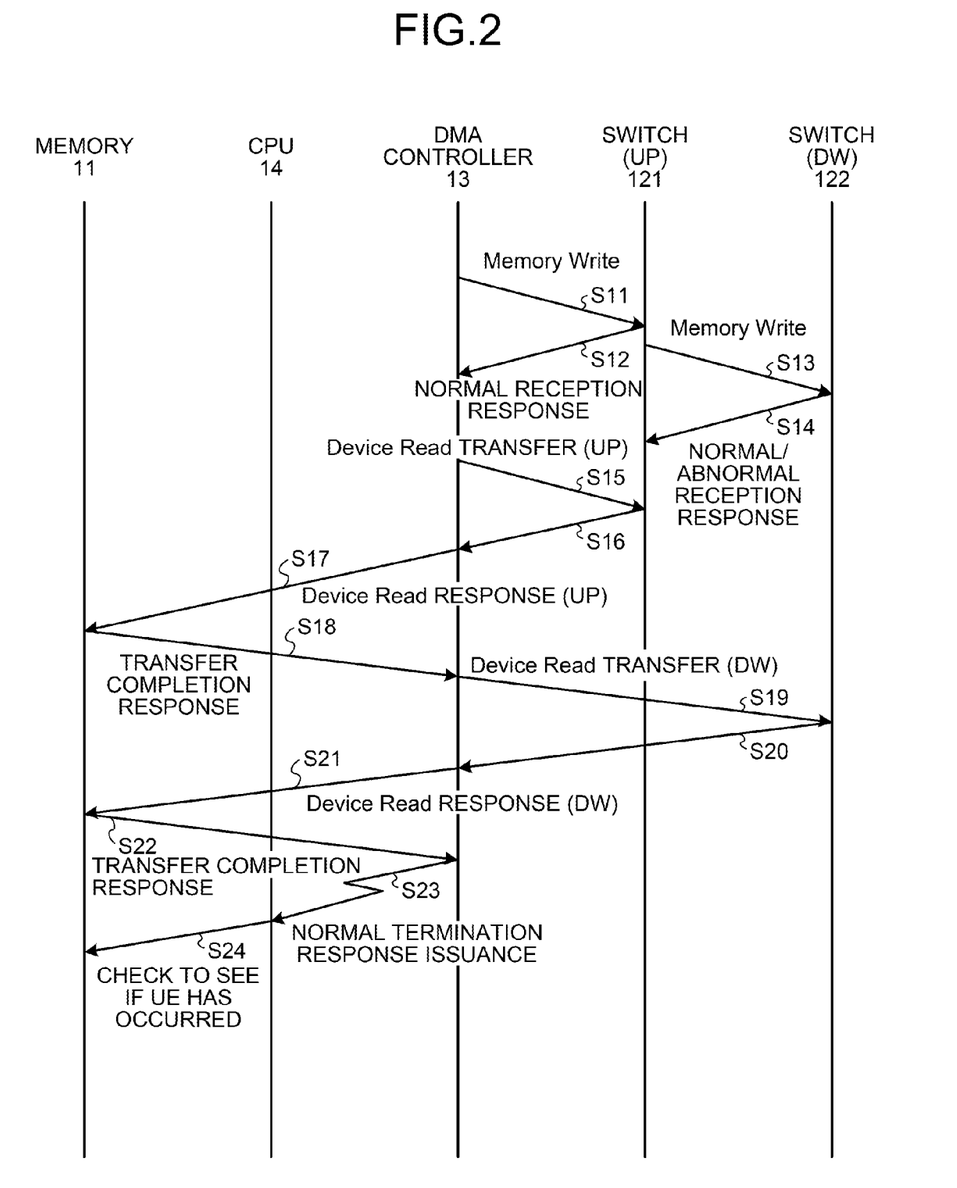
FIG. 2 is a sequence chart of a CM according to the first embodiment.

Next, a sequence of the CM according to the first embodiment will be explained, with reference to FIG. 2. FIG. 2 is a sequence chart of the CM. It is assumed that the CM 1 is a CM provided on the communication starting side.

As illustrated in FIG. 2, the DMA controller 13 instructs the UP 121 of the switch 12 to perform, on the data stored in the memory 11, a write transfer ("Memory write") to the memory 21 of the other CM 2 (step S11).

In the switch 12, the UP 121 of the switch 12 receives the "Memory write" instruction and transmits a response indicating that the instruction was normally received, to the DMA controller 13 (step S12). In this situation, the UP 121 stores therein a transfer status indicating normal. In addition, the UP 121 instructs the DW 122 to perform a "Memory write" to the memory 21 of the other CM 2 (step S13). Accordingly, the DW 122 responds to the UP 121 to indicate whether the write transfer performed in response to the instruction from the UP 121 was normal or abnormal (step S14). In that situation, the DW 122 stores therein a transfer status indicating normal/abnormal. For example, if the write transfer to the other CM 2 is successful, the DW 122 transmits a response indicating normal to the UP 121. On the contrary, if the write transfer to the other CM 2 has failed, the DW 122 transmits a response indicating abnormal to the UP 121. However, that the UP 121 does not notify the DMA controller 13 of whether the write transfer was normal or abnormal.

Upon receiving the response indicating that the "Memory write" instruction was normally received, the DMA controller 13 instructs the UP 121 of the switch 12 to read ("Device Read") the data transfer status (step S15).

In the switch 12, the UP 121 of the switch 12 receives the "Device Read" instruction, reads the transfer status, and responds to the DMA controller 13 with the read transfer status (step S16).

Accordingly, the DMA controller 13 writes the transfer status received from the UP 121 into the memory (step S17). After that, upon receiving a response from the memory 11 indicating a transfer completion (step S18), the DMA controller 13 instructs the DW 122 of the switch 12 to read ("Device Read") the data transfer status (step S19).

In the switch 12, the DW 122 of the switch 12 receives the "Device Read" instruction, reads the transfer status, and responds to the DMA controller 13 with the read transfer status (step S20).

Accordingly, the DMA controller 13 writes the transfer status received from the DW 122 into the memory (step S21). After that, upon receiving a response indicating a transfer completion from the memory 11 (step S22), the DMA controller 13 transmits a response indicating a normal termination to the CPU 14 (step S23). The CPU 14 receives the response indicating the normal termination and checks to see if a UE has occurred or not (step S24). In other words, the CPU 14 reads the transfer status written in the memory 11.

Advantageous Effects of the First Embodiment

According to the first embodiment described above, the DMA controller 13 transfers the data stored in the memory 11 to the other CM 2 via the switch 12. Further, the DMA controller 13 reads the transfer status from the switch 12 and writes the read transfer status into the memory 11. With these arrangements, because the DMA controller 13, in place of the CPU 14, reads the transfer status from the switch 12, the reading process performed by the CPU 14 is not performed. Thus, the entire performance within the CM 1 is improved. In other words, during the reading process, the CPU 14 is able to perform other processes in parallel therewith. Thus, the entire performance within the CM 1 is improved.

Further, according to the first embodiment described above, the CPU 14 reads the transfer status written by the DMA controller 13, from the memory 11. With this arrangement, because the CPU 14 reads the transfer status from the memory 11, it is possible to speedily detect abnormalities in the paths between the CMs.

[b] Second Embodiment

In the first embodiment, the example was explained in which the DMA controller 13 transfers the data stored in the memory 11 to the other CM 2 via the switch 12 and reads the transfer status from the switch 12, and the entire performance within the CM 1 is thereby improved. However, possible embodiments are not limited to this example. The DMA controller 13 may further be configured so that the performance within the CM 1 is improved with regard to reading of a progress status of a DMA in a situation where the transfer status is normal.

Figure 3:
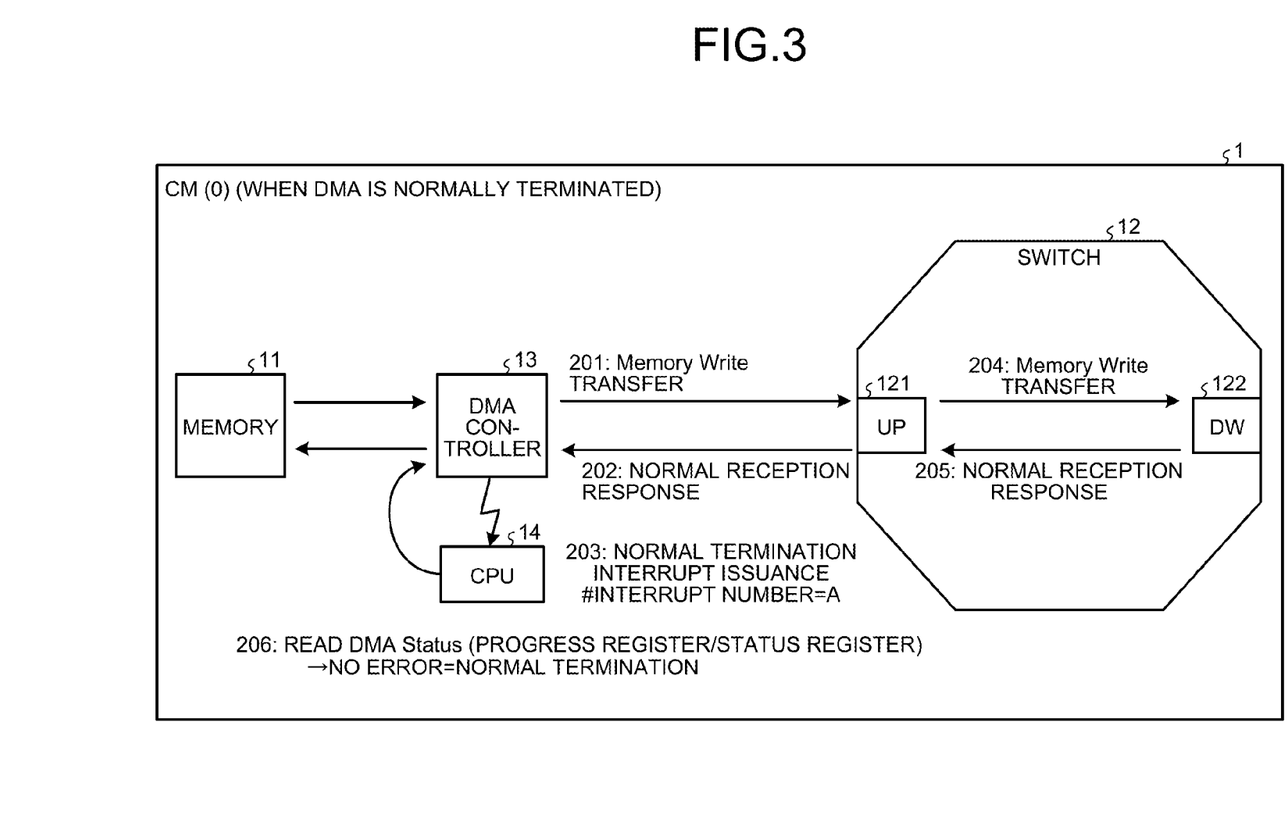
FIG. 3 is a drawing for explaining a problem related to reading of a completion state of a Direct Memory Access (DMA)

Next, a problem related to the reading of a completion state including a progress status of a DMA will be explained, with reference to FIG. 3. FIG. 3 is a drawing for explaining the problem related to the reading of the completion state of the DMA. As illustrated in FIG. 3, the DMA controller 13 would instruct the switch 12 to perform, on the data stored in the memory 11, a write transfer to the memory 21 of the other CM 2 (step S201). The switch 12 would receive the instruction to perform the write transfer to the memory 21 and transmit a normal response in response to the write transfer to the memory 21 (step S202). The normal response only guarantees the receipt of the request to the other CM 2 and does not guarantee that the other CM 2 has completed the writing process into the memory 21. The DMA controller 13 would receive the normal response and notify the CPU 14 of a normal termination interrupt (step S203).

The switch 12 would receive the instruction to perform the write transfer to the memory 21 and perform the write transfer to the memory 21 of the other CM 2 (step S204). In this situation, let us assume that the switch 12 is successful in performing the write transfer. Accordingly, the switch 12 would transmit a response indicating a normal write transfer (step S205). In this situation, the DMA controller 13 would not be able to recognize that the write transfer was normal.

The CPU 14 would be notified of a normal termination interrupt and read a completion state of the DMA from a progress register and a status register in the DMA controller 13 (step S206). In situations with a normal termination of the DMA, the progress register would store therein a progress status indicating up to where the DMA has been completed, in addition to the information indicating the normal termination of the DMA. In situations with an abnormally termination, the status register would store therein information indicating the abnormal termination of the DMA, as well as information indicating what type of abnormality occurred.

As explained above, because the CPU 14 would read the completion state including the progress status of the DMA from the progress register and the status register in the DMA controller 13, a problem is observed where it would take time to perform the reading process, and the performance within the CM 1 would thus be degraded.

To cope with this situation, an example will be explained in the second embodiment in which, when performing a DMA, the DMA controller 13 reads a status of a transfer to the CM 2 from the switch 12 and, if the transfer status indicates normal, the performance in reading the progress status of the DMA is improved.

A Configuration of the RAID Apparatus According to the Second Embodiment

Figure 4:
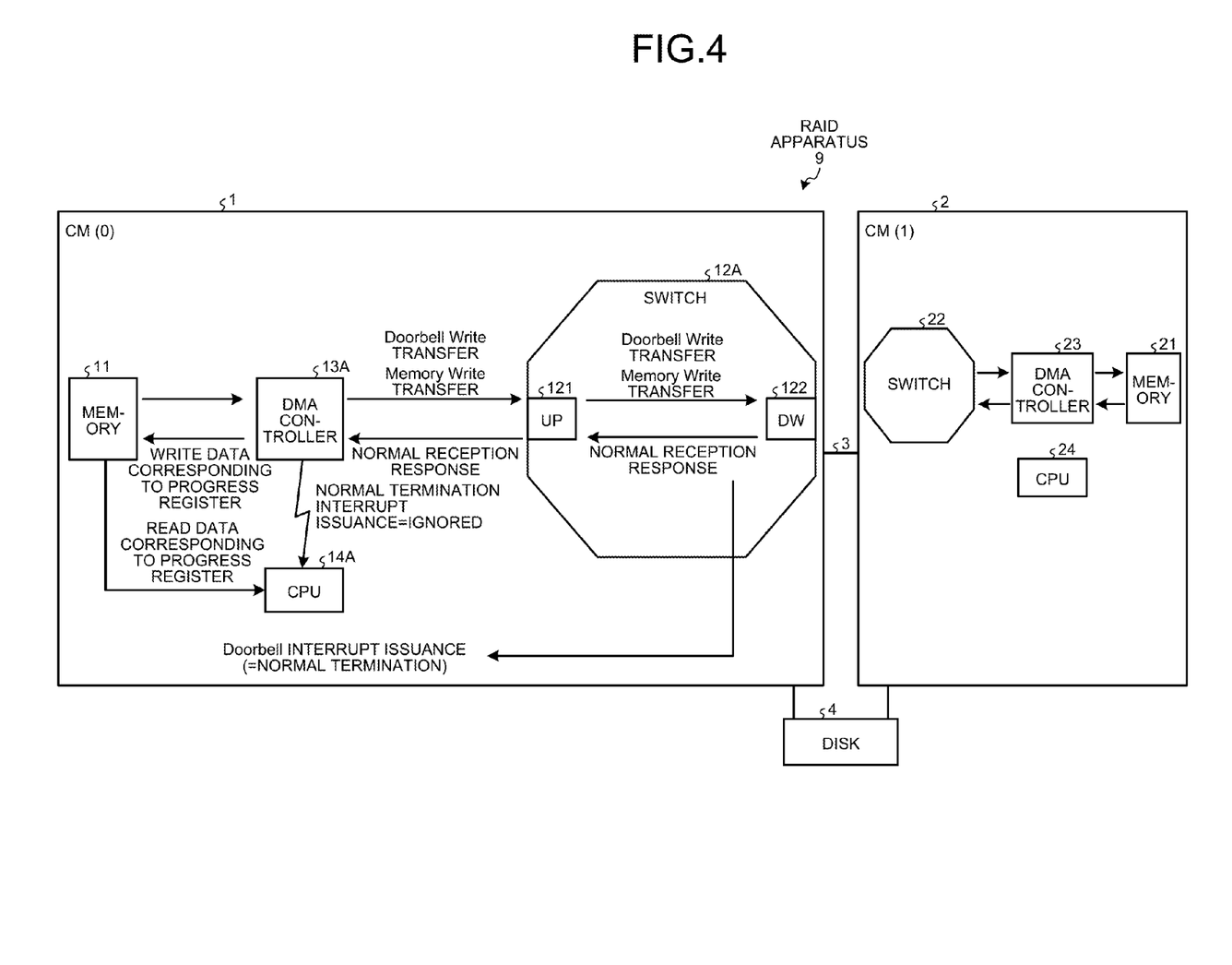
FIG. 4 is a diagram of a hardware configuration of a RAID apparatus according to a second embodiment.

FIG. 4 is a diagram of a hardware configuration of a RAID apparatus according to the second embodiment. Some of the constituent elements that are the same as those of the RAID apparatus 9 illustrated in FIG. 1 will be referred to by using the same reference characters. Thus, the explanations of the identical configurations and operations will be omitted. The differences between the first embodiment and the second embodiment lie in that the DMA controller 13 is replaced with a DMA controller 13A, that the switch 12 is replaced with a switch 12A, and that the CPU 14 is replaced with a CPU 14A.

The switch 12A may be a PCI Express switch, for example, and is configured to perform a data transfer to the switch 22 in the other CM 2 and to perform a data transfer between the devices within the CM 1. The switch 12A is equipped with a doorbell function to notify the CPU 14A of an interrupt when a writing process has normally been performed into one of the devices thereof. For example, the switch 12A is configured so that data is written into the UP 121 and the DW 122 according to a doorbell write transfer instruction from the DMA controller 13A (explained later). After that, the switch 12A notifies the CPU 14A of a doorbell interrupt, if the data has normally been written. In other words, if the doorbell interrupt notification is issued, it means that the completion of the write transfer to the other CM 2 is guaranteed.

The DMA controller 13A is a controller that implements a method by which data is directly transferred between the memory 11 and each of the devices without going through the CPU 14A. The DMA controller 13A instructs the switch 12A to perform, on the data stored in the memory 11, a write transfer to the memory 21 of the other CM 2. After that, the DMA controller 13A instructs the switch 12A to read a data transfer status and writes the read transfer status into the memory 11. These processes are the same as those in the first embodiment. Thus, the explanation of the operations thereof will be omitted. The DMA controller 13A serves as an example of the data transfer unit, the transfer status detecting unit, and the progress status detecting unit.

For example, upon receiving a normal response from the switch 12A in response to the instruction to perform the write transfer to the memory 21 of the other CM 2, the DMA controller 13A writes a progress status corresponding to the progress register into the memory 11. After that, the DMA controller 13A instructs the switch 12A to perform a doorbell write transfer.

The CPU 14A reads the progress status written in the memory 11. Further, although the CPU 14A reads the transfer status written in the memory 11, because this process is the same as the process performed in the first embodiment, the explanation of the operation thereof will be omitted.

For example, upon receiving a doorbell interrupt from the switch 12A, the CPU 14A reads the progress status written in the memory 11. With this arrangement, because the CPU 14A reads the progress status not from the register of the DMA controller 13A but from the memory 11, it is possible to speedily detect the progress status of the DMA.

A Sequence of the CM

Figure 5:
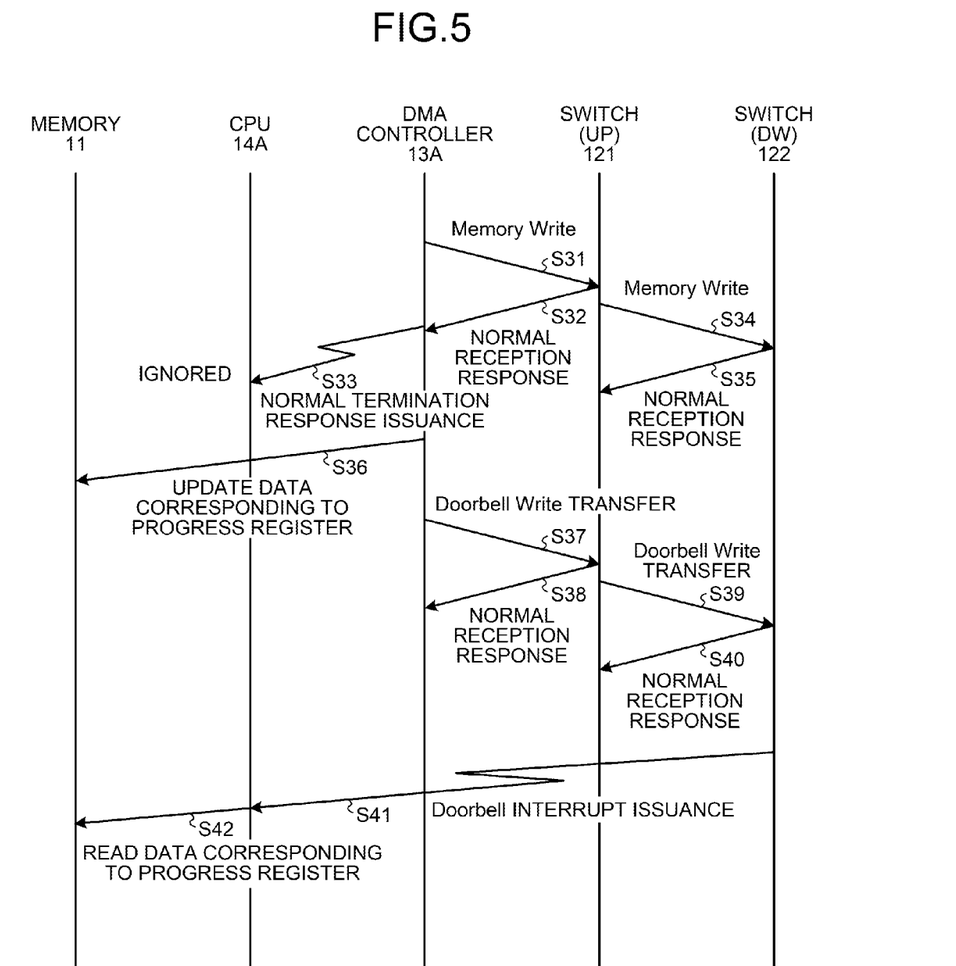
FIG. 5 is a sequence chart of a CM according to the second embodiment.

Next, a sequence of the CM according to the second embodiment will be explained with reference to FIG. 5. FIG. 5 is a sequence chart of the CM according to the second embodiment. It is assumed that the CM 1 is a CM provided on the communication starting side. Further, let us assume that the transfer status of the DMA is normal.

As illustrated in FIG. 5, the DMA controller 13A instructs the UP 121 of the switch 12A to perform, on the data stored in the memory 11, a write transfer ("Memory write") to the memory 21 of the other CM 2 (step S31).

In the switch 12A, the UP 121 of the switch 12A receives the "Memory write" instruction and transmits a response indicating that the instruction was normally received, to the DMA controller 13A (step S32). In addition, the UP 121 instructs the DW 122 to perform a "Memory write" to the memory 21 of the other CM 2 (step S34). Accordingly, because the transfer status of the DMA is normal in the present example, the DW 122 responds to the UP 121 that the write transfer performed in response to the instruction from the UP 121 was normal (step S35).

Upon receiving the response indicating that the "Memory write" instruction was normally received, the DMA controller 13A transmits a response indicating a normal termination to the CPU 14A (step S33). The CPU 14A performs no process in response to the transmitted response. After that, the DMA controller 13A writes a progress status corresponding to the progress register into the memory 11 (step S36). Subsequently, the DMA controller 13A instructs the UP 121 of the switch 12A to perform a doorbell write transfer ("Doorbell write") (step S37).

In the switch 12A, the UP 121 of the switch 12A receives the "Doorbell write" instruction and transmits a response indicating that the instruction was normally received, to the DMA controller 13A (step S38). In addition, the UP 121 instructs the DW 122 to perform a "Doorbell write" process (step S39). Accordingly, because the transfer status of the DMA is normal in the present example, the DW 122 responds to the UP 121 that the write transfer performed in response to the instruction from the UP 121 was normal (step S40). After that, because the write transfer was normal, the DW 122 notifies the CPU 14A of a doorbell interrupt (step S41).

Upon receiving the doorbell interrupt, the CPU 14A reads the data corresponding to the progress register from the memory 11 (step S42). In other words, the CPU 14A reads the progress status of the DMA written in the memory 11.

Advantageous Effects of the Second Embodiment

According to the second embodiment described above, upon receiving the response corresponding to the data transfer from the switch 12A, the DMA controller 13A writes the progress status corresponding to the data transfer into the memory 11. Further, the DMA controller 13A causes the CPU 14A to be notified of the interrupt that is issued when the data has normally been written into the device in the switch 12A. With these arrangements, by causing the switch 12A to notify the CPU 14A of the interrupt that is issued when the data has normally been written into the device in the switch 12A, the DMA controller 13A is able to inform the CPU 14A that the writing was successful up to the device.

Further, according to the second embodiment, at the time when the CPU 14A receives the interrupt from the switch 12A, the CPU 14A reads the progress status written in the memory 11. With this arrangement, because the CPU 14A reads the progress status not from the register of the DMA controller 13A but from the memory 11, it is possible to speedily detect the progress status.

[c] Third Embodiment

In the second embodiment, the example was explained in which, when performing the DMA, the DMA controller 13A reads the status of the transfer to the other CM 2 from the switch 12A and, if the transfer status indicates normal, the performance in reading the progress status of the DMA is improved. In other words, the DMA controller 13A causes the CPU 14A to read the progress status of the DMA corresponding to the progress register obtained when the transfer status is normal, by utilizing the doorbell function of the switch 12A. However, a problem remains where, if a plurality of DMA commands are in operation, a completing process may mistakenly be performed for an incomplete DMA command.

Figure 6:
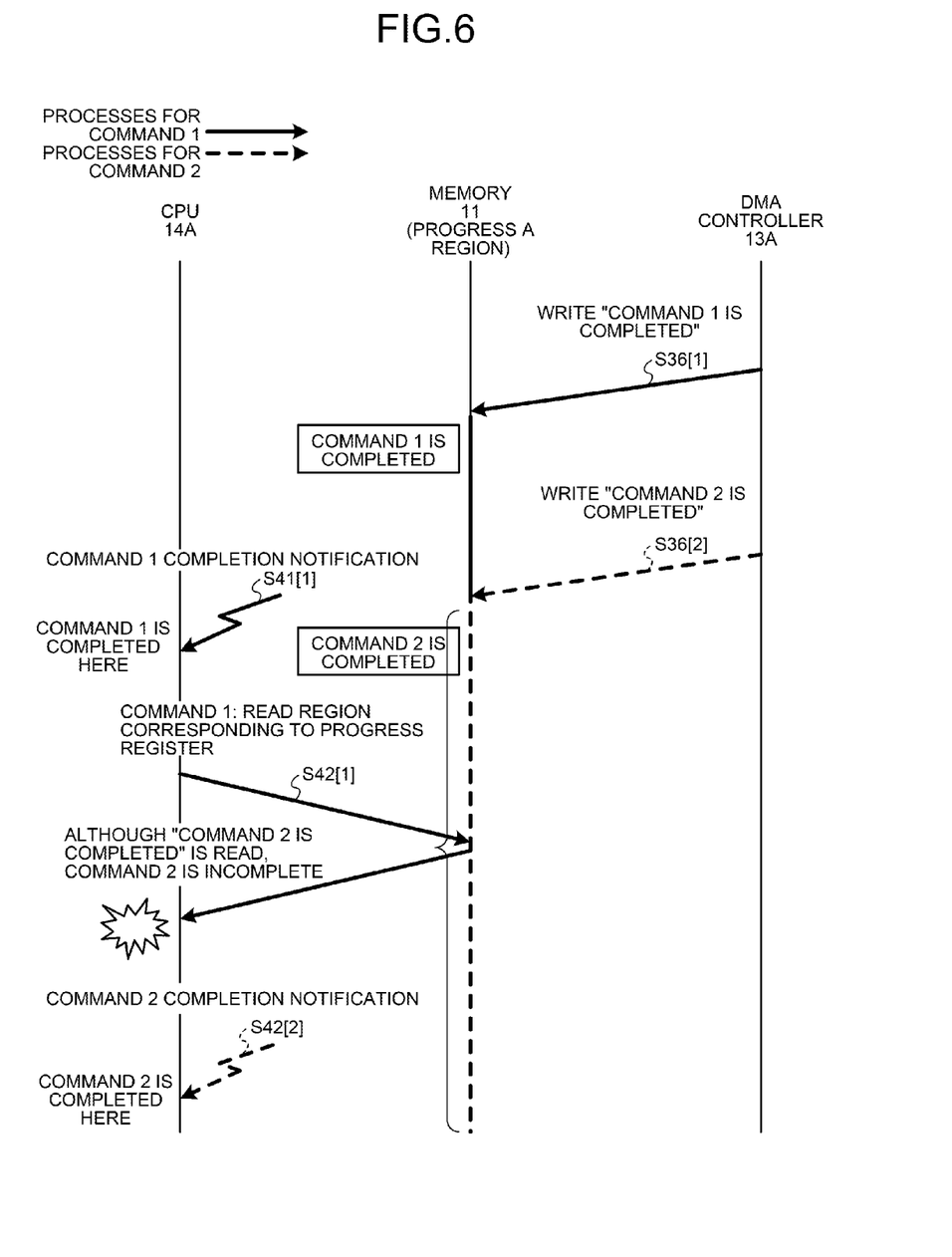
FIG. 6 is a drawing for explaining a situation in which a completing process is mistakenly performed for an incomplete DMA command.

This problem will be explained with reference to FIG. 6. FIG. 6 is a drawing for explaining the situation in which a completing process is mistakenly performed for an incomplete DMA command. The DMA command may be, for example, a command to perform a write transfer ("Memory Write") to the memory 21 of the other CM 2. It is assumed that command 1 and command 2 are in operation. It is assumed that the memory 11 has assigned therein, in advance, a progress A region into which a progress status corresponding to progress A is to be written. Further, FIG. 6 refers to the processes in the sequence illustrated in FIG. 5. Processes related to command 1 will be indicated as [1], whereas processes related to command 2 will be indicated as [2].

In this circumstance, the DMA controller 13A would receive a response from the switch 12A indicating that an instruction for command 1 was normally received and would write a progress status corresponding to progress A into the progress A region of the memory 11 (step S36[1]). In one example, "command 1 is completed" would be written into the progress A region.

Subsequently, the DMA controller 13A would receive a response from the switch 12A indicating that an instruction for command 2 was normally received and would write a progress status corresponding to progress A into the progress A region of the memory 11 (step S36[2]). In one example, "command 2 is completed" would be written into the progress A region.

After that, when the CPU 14A receives a doorbell interrupt for command 1 (step S41[1]), command 1 would be completed. After that, the CPU 14A would read the data corresponding to progress A from the progress A region in the memory 11 (step S42[1]). In this situation, the CPU 14A would read "command 2 is completed". In other words, although command 2 is incomplete, a completing process would mistakenly be performed for command 2 that is incomplete.

To cope with this situation, in a third embodiment, a configuration of the CM 1 will be explained in which the CM 1 does not mistakenly perform a completing process for an incomplete DMA command, even if a plurality of DMA commands are in operation.

A Configuration of a RAID Apparatus According to the Third Embodiment

The hardware configuration of a RAID apparatus according to the third embodiment is the same as the hardware configuration of the RAID apparatus according to the second embodiment (see FIG. 4). Thus, the explanations of the identical configurations and operations will be omitted.

The DMA controller 13A assigns two progress regions corresponding to the progress register to the memory 11 and writes a progress status into each of the two progress regions. For example, upon receiving from the UP 121 of the switch 12A, a normal response in response to an instruction to perform a write transfer to the memory 21 of the other CM 2, the DMA controller 13A writes, in an example, an identifier of the DMA command that is currently in operation into the first progress region of the memory 11, as a progress status corresponding to the progress register. After that, the DMA controller 13A instructs the switch 12A to perform a doorbell write transfer. Further, upon receiving a data transfer status from the DW 122 of the switch 12A, the DMA controller 13A writes, in an example, an identifier of the DMA command that is currently in operation into the second progress region of the memory 11, as a progress status corresponding to the progress register. With these arrangements, the DMA controller 13A is able to store the progress up to the UP 121 and the progress up to the DW 122 into the memory 11, as information indicating the progress of the DMA. As a result, the CPU 14A (explained later) is able to understand the plurality of progress statuses.

The CPU 14A reads the progress statuses written in the memory 11. For example, upon receiving a doorbell interrupt from the switch 12A, the CPU 14A reads the progress statuses written in the two progress regions of the memory 11. Further, the CPU 14A judges whether the two read progress statuses are the same as each other. If it is determined that the two progress statuses are the same as each other, the CPU 14A determines that the completing process has been performed up to the devices corresponding to the two progress regions. On the contrary, if it is determined that the two progress statuses are not the same as each other, the CPU 14A determines that the completing process has been performed up to the device corresponding to one of the progress regions. Further, if it is determined that the two progress statuses are not the same as each other, the CPU 14A performs a judging process, in an example, so as to confirm that the two progress regions become the same as each other when a predetermined period of time has elapsed.

After instructing the switch 12A to perform the doorbell write transfer, the DMA controller 13A instructs the UP 121 and the DW 122 of the switch 12A to each read a data transfer status. As a result, it is possible to solve the problem where, when a plurality of DMA commands are in operation, a completing process is mistakenly performed for the (following) incomplete DMA command. Until the reading of the transfer status of the current DMA command is completed, the switch 12A will not execute the following DMA command. Thus, the DMA controller 13A is not able to process the following DMA command, unless the reading of the transfer status of the current DMA command is completed. Further, the switch 12A always performs first a doorbell write transfer instructed before the reading of the current DMA command and notifies the CPU 14A of the doorbell interrupt first. With this arrangement, because the CPU 14A receives the doorbell interrupt before the following DMA command is processed, there is no possibility that the progress status of the following DMA command is read at this stage. In other words, even if the plurality of DMA commands are in operation, it is possible to prevent the completing process from being mistakenly performed for the (following) incomplete DMA command.

A Sequence of the CM

Next, a sequence of the CM according to the third embodiment will be explained, with reference to FIG. 7.

Figure 7:
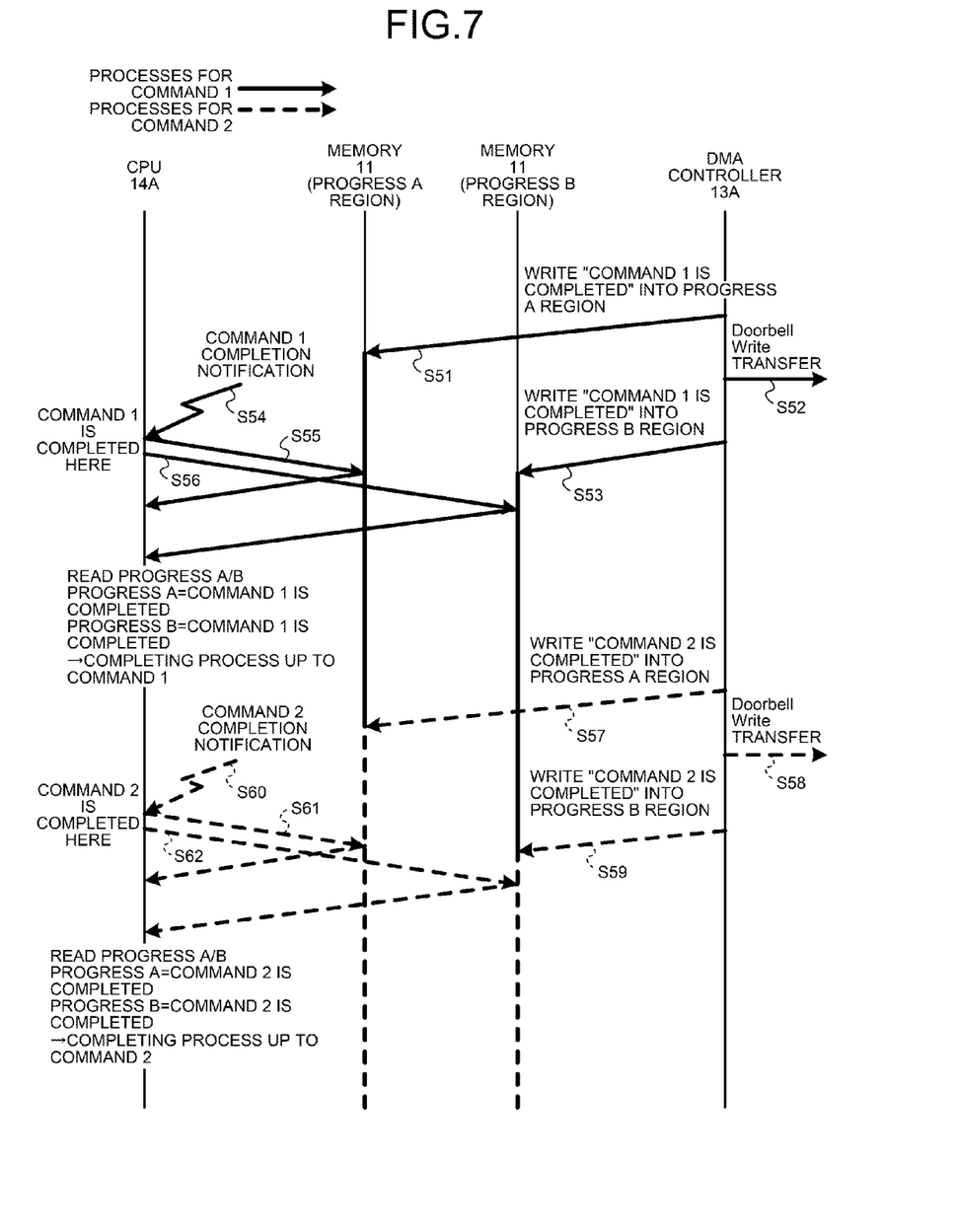
FIG. 7 is a sequence chart of a CM according to a third embodiment.

FIG. 7 is a sequence chart of the CM. It is assumed that command 1 and command 2 are currently in operation. Further, it is assumed that the memory 11 has assigned therein, in advance, a progress A region into which a progress status corresponding to progress A is to be written and a progress B region into which a progress status corresponding to progress B is to be written.

As illustrated in FIG. 7, the DMA controller 13A receives a response from the switch 12A indicating that an instruction for command 1 was normally received and writes a progress status corresponding to progress A into the progress A region of the memory 11 (step S51). In one example, "command 1 is completed" is written into the progress A region. Subsequently, the DMA controller 13A instructs the UP 121 of the switch 12A to perform a doorbell write transfer ("Doorbell write") (step S52).

Subsequently, the DMA controller 13A receives a transfer status from the DW 122 of the switch 12A and writes a progress status corresponding to progress B into the progress B region of the memory 11 (step S53). In one example, "command 1 is completed" is written into the progress B region.

After that, when the CPU 14A receives a doorbell interrupt for command 1 from the switch 12A (step S54), command 1 is completed. After that, the CPU 14A reads the data corresponding to progress A from the progress A region in the memory 11 (step S55). Further, the CPU 14A reads the data corresponding to progress B from the progress B region in the memory 11 (step S56). In this situation, because the progress A region and the progress B region both refer to command 1 and are the same as each other, the CPU 14A is able to determine that a completing process has been performed for command 1 up to the devices corresponding to the two progress regions.

Subsequently, the DMA controller 13A receives a response from the switch 12A indicating that an instruction for command 2 was normally received and writes a progress status corresponding to progress A into the progress A region of the memory 11 (step S57). In one example, "command 2 is completed" is written into the progress A region. Subsequently, the DMA controller 13A instructs the UP 121 of the switch 12A to perform a doorbell write transfer ("Doorbell write") (step S58).

Subsequently, the DMA controller 13A receives a transfer status from the DW 122 of the switch 12A and writes a progress status corresponding to progress B into the progress B region of the memory 11 (step S59). In one example, "command 2 is completed" is written into the progress B region.

After that, when the CPU 14A receives a doorbell interrupt for command 2 from the switch 12A (step S60), command 2 is completed. After that, the CPU 14A reads the data corresponding to progress A from the progress A region in the memory 11 (step S61). Further, the CPU 14A reads the data corresponding to progress B from the progress B region in the memory 11 (step S62). In this situation, because the progress A region and the progress B region both refer to command 2 and are the same as each other, the CPU 14A is able to determine that a completing process has been performed for command 2 up to the devices corresponding to the two progress regions.

Advantageous Effects of the Third Embodiment

According to the third embodiments described above, upon receiving the response corresponding to the data transfer from the switch 12A, the DMA controller 13A writes the progress status corresponding to the data transfer into the first region of the memory 11. After that, when having read the transfer status from the DW 122 of the switch 12A, the DMA controller 13A writes the progress status corresponding to the data transfer into the second region of the memory 11. Further, the DMA controller 13A causes the CPU 14A to be notified of the interrupt that is issued when the data has normally been written into the device in the switch 12A. After that, the CPU 14A reads the progress statuses written in the first and the second regions at the time of receiving the interrupt. With these arrangements, because the DMA controller 13A writes the progress statuses corresponding to the data transfer into the first and the second regions of the memory 11, it is possible to have the progress statuses stored in relation to the data transfer. As a result, the CPU 14A is able to understand the plurality of progress statuses related to the data transfer.

Others

In the third embodiment, the DMA controller 13A assigns the two progress regions corresponding to the progress register to the memory 11 and writes the progress status into each of the two progress regions. However, possible embodiments are not limited to this example. The DMA controller 13A may assign two or more progress regions corresponding to the progress register to the memory 11 and write a progress status into each of the plurality of assigned progress regions. With this arrangement, the DMA controller 13A is able to further have the plurality of progress statuses stored in the memory 11, as information indicating the progress of the DMA.

According to an aspect of the system described in the present disclosure, it is possible to improve the entire performance within the CM when performing a write transfer to the memory of another CM.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage controlling device comprising:
   a memory that temporarily stores therein data to be written into storage;
   a switch that connects to another storage controlling device;
   a data transfer unit that transfers the data stored in the memory to the another storage controlling device via the switch; and
   a transfer status detecting unit that reads a transfer status of the data transferred by the data transfer unit from the switch and writes the read transfer status into the memory.

2. The storage controlling device according to claim 1, further comprising:
   a controlling unit that reads the transfer status written by the transfer status detecting unit from the memory.

3. The storage controlling device according to claim 2, further comprising:
   a progress status detecting unit that, upon receiving a response corresponding to the data transfer by the data transfer unit from the switch, writes a progress status corresponding to the data transfer into the memory, and further causes the controlling unit to be notified of an interrupt that is issued when the data is normally written into a device within the switch.

4. The storage controlling device according to claim 3, wherein the controlling unit reads the progress status written in the memory at a time of receiving the interrupt.

5. The storage controlling device according to claim 4, wherein
   the progress status detecting unit writes the progress status corresponding to the data transfer into a first region of the memory upon receiving the response corresponding to the data transfer by the data transfer unit from the switch, writes the progress status corresponding to the data transfer into a second region of the memory upon reading of the transfer status from the switch by the transfer status detecting unit, and further causes the controlling unit to be notified of the interrupt that is issued when the data has normally been written into the device within the switch, and
   the controlling unit reads the progress statuses written in the first and the second regions at the time of receiving the interrupt.

6. A non-transitory computer-readable recording medium storing therein a controlling program that causes a computer to execute a process comprising:
   transferring data stored in a memory to another storage controlling device via a switch that connects to the another storage controlling device, the memory temporarily storing therein data to be written into storage; and
   reading a transfer status of the data transferred at the transferring from the switch and writing the read transfer status into the memory.

7. A controlling method performed by a storage controlling device, the method comprising:
   transferring data stored in a memory to another storage controlling device via a switch that connects to the another storage controlling device, the memory temporarily storing therein data to be written into storage, using a processor; and reading a transfer status of the data transferred at the transferring from the switch and writing the read transfer status into the memory, using the processor.

\* \* \* \* \*